United States Patent
Huang (10) Patent No.: US 7,733,640 B2
(45) Date of Patent: Jun. 8, 2010

(54) DRIVE CONVERSION ENCLOSURE (75) Inventor: Jim CC Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 12/191,530

(22) Filed: Aug. 14, 2008

(65) Prior Publication Data
US 2009/0059510 A1 Mar. 5, 2009

(30) Foreign Application Priority Data
Aug. 27, 2007 (TW) .............................. 96131716 A (51) Int. Cl.
G06F 1/16 (2006.01)
(52) U.S. Cl. .................. 361/679.33; 361/724
(58) Field of Classification Search ............ 361/679.33, 361/724–727
See application file for complete search history.

(56) References Cited

U.S. PATENT DOCUMENTS

| 5,625,534 | A  | * | 4/1997 | Okaya et al. | 361/679.32 |
| 6,075,694 | A  | * | 6/2000 | Mills et al. | 361/679.02 |
| 6,445,576 | B1 |   | 9/2002 | Wooden et al. | |
| 6,580,604 | B1 | * | 6/2003 | McAnally et al. | 361/679.4 |
| 6,862,172 | B2 |   | 3/2005 | Erickson et al. | |
| 6,876,547 | B2 |   | 4/2005 | McAlister | |
| 7,190,574 | B2 | * | 3/2007 | Muenzer et al. | 361/679.32 |
| 7,200,003 | B2 | * | 4/2007 | Hood et al. | 361/679.33 |
| 7,289,317 | B2 | * | 10/2007 | Hood et al. | 361/679.33 |
| 7,499,286 | B2 | * | 3/2009 | Berke et al. | 361/756 |
| 7,523,901 | B2 | * | 4/2009 | Wu et al. | 248/225.21 |
| 2003/0095377 | A1 | * | 5/2003 | Goodman et al. | 361/685 |
| 2005/0105265 | A1 | * | 5/2005 | Petrov et al. | 361/685 |
| 2006/0002004 | A1 |   | 1/2006 | Albrecht et al. | |

* cited by examiner

Primary Examiner—Lisa Lea-Edmonds
(74) Attorney, Agent, or Firm—H. Daniel Schnurmann (57) ABSTRACT A conversion enclosure allows a first group of hard disk drives of a first size to be received by a hard disk drive enclosure having a second group of hard disk drives of a second size. The conversion enclosure includes a chassis having first and second side panels, each of the side panels having a front edge and a rear edge, a plurality of pairs of chassis rails having a first rail of each of the pairs of chassis rails connected to the first side panel, and the second rails connected to the second side panel. Pairs of slots are included therein, each slot bounded on one side by a first plane passing through a first pair of chassis rails, and on the other side, by a second plane passing through the second pair of chassis rails adjacent to the first pair. The conversion enclosure includes a pair of engaging panels, each having a vented area respectively connected to the rear edge of the first side panel and to the rear edge of the second side panel. The engaging panels respectively engage the hard disk drive enclosure in response to the conversion enclosure being inserted and located into the hard disk drive enclosure.

24 Claims, 6 Drawing Sheets

FIG. 6D

DRIVE CONVERSION ENCLOSURE

FIELD OF THE INVENTION

The invention relates generally to a computer system, and more particularly to a drive conversion enclosure.

BACKGROUND OF THE INVENTION

Computer systems, such as servers, usually employ a disk drive group consisting of a plurality of disk drives. In consideration of cost and effectiveness, it is advantageous for manufacturing purposes that servers formed by a plurality of disk drives have a specific size (such as a group of 3.5 inch disk drives, a group of 2.5 inch disk drives, or a group of other size disk drives) selected to achieve the best effect.

Computer systems manufacturers generally find it difficult to fulfill orders requiring disk drives of different sizes for a specific computer system model. Firstly, enclosures for different groups of disk drives of different sizes are first manufactured, causing a waste of human resources and material resources. Secondly, if enclosures for groups of disk drives of different sizes are first manufactured when large orders for computer systems using disk drives of a specific size, the enclosures of the specific size may be ready for use, but the enclosures of other sizes remain lying idle in a warehouse.

Figure 6A:
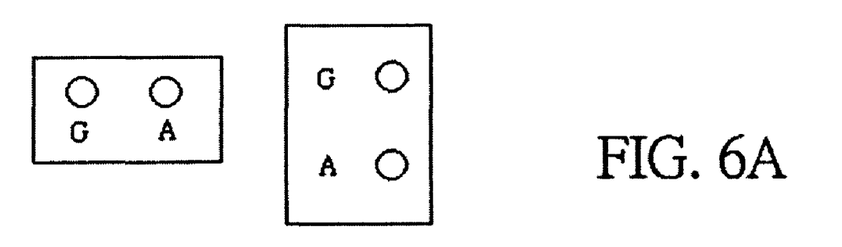
FIG. 6 shows LEDs status of hard disk drives of a server under various environments.
Figure 6B:
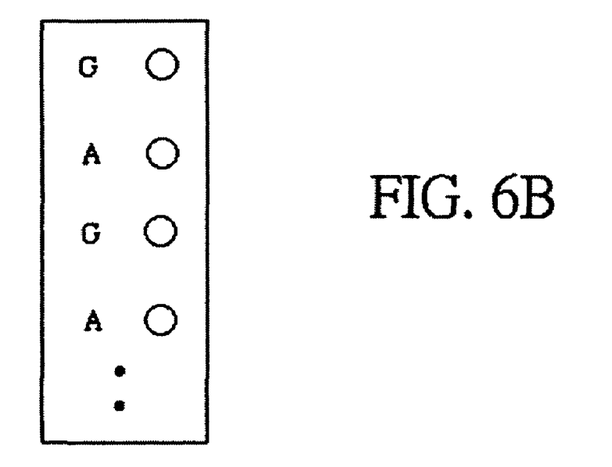
Figure 6C:
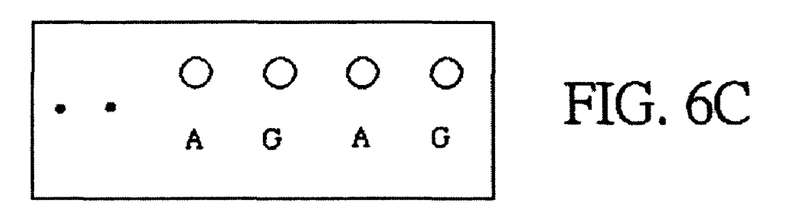
Figure 6D:
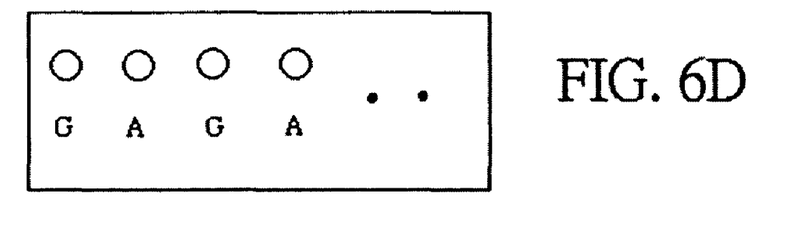

Alternatively, for server systems, even for rack or tower type servers, groups of disk drives are used. When a tower type server is arranged from a vertical position to a horizontal position, it is usually served as a rack type server. Referring to FIG. 6A, the panel of a hard disk drive includes two LEDs in a vertical position and the panel of a hard disk drive includes two LEDs in a horizontal position, wherein G (green) stands for a normal operation, and A (amber) stands for a malfunction operation. In consideration for individuals having poor color vision, present rules for arranging the servers containing a group of disk drives are such that a green LED is always located on the left and an amber LED on the right when it is in a horizontal position; and the green LED is located on the top, and the amber LED on the bottom when it is in a vertical position. For a tower type server having a group of disk drives, the LED status is shown in FIG. 6B. When the tower type server is brought down to serve as a rack type server, different directions for bringing down the server result in different LED status. FIG. 6C shows when the tower type server is brought down to the right, and FIG. 6D illustrates when the tower server is brought down to the left. In other words, different directions of bringing down the tower type server result in different LED status. To individuals having poor color vision this may be confusing by being unable to determine what is the correct LED status.

Accordingly, there is a need in the computer system technology for a disk drive conversion having a low cost, high efficiency, and convenient use. There is also a need for disk drive conversion suitable for individuals with poor color vision.

SUMMARY OF THE INVENTION

In one aspect of the present invention, a conversion enclosure is provided requiring no tools for assembling a low-cost, highly efficient system, suitable for individuals having poor color vision enclosure.

A another aspect of the present invention, a conversion enclosure is provided for converting a first group of drives of a first size adapted to be received by a drive enclosure consisting of a second group of drives of a second size. The conversion enclosure may also include a chassis having first and second side panels, each of the side panels including a front edge and a rear edge, the first side panel being substantially parallel to and opposing the second side panel and the chassis being correspondingly received in the drive enclosure.

The conversion enclosure may further include a pairs of first and second chassis rails, the first rail of each of the pairs of chassis rails being connected to the first side panel, and the second rail of each of the pairs of chassis rails being connected to the second side panel. Moreover, the conversion enclosure includes a plurality of pairs of slots for respectively receiving the second group of drives, wherein each slot is bounded on one side by a first plane passing through a first pair of chassis rails, and on the other side, by a second plane passing through a second pair of chassis rails adjacent to the first pair of chassis rails. Furthermore, the conversion enclosure includes a pair of engaging panels, each connected to the rear edge of the first side and second side panels, wherein the panels respectively engage the drive enclosure in response to the conversion enclosure located in the drive enclosure.

To increase flexibility, each engaging panel can advantageously have a vented area. The ratio of the vented area and the entire area of each of the engaging panels can be X, with X ranging from 0.37 to 1. The engaging panels can be bent inwardly and inserted in an opening of the drive enclosure in response to the conversion enclosure being inserted into the drive enclosure.

For illustrative purposes, the first group of drives of a first size preferably includes a group of 3.5 inch hard disk drives, the number of the first group ranging from 1 to 8. The second group of drives of a second size can include a group of 2.5 inch hard disk drives, the number of the second group ranging from 1 to 12. Alternatively, the first group of drives of a first size preferably includes a group of 2.5 inch hard disk drives, the number of the first group ranging from 1 to 12. The second group of drives of a second size that includes a plurality of 3.5 inch hard disk drives, the number of the second group ranging from 1 to 8.

The drive enclosure may also include a hard drive enclosure of the system enclosure, the drive being a hard disk drive or a solid state drive. The enclosure may include a hard disk drive enclosure or a solid state drive enclosure.

The conversion enclosure can further include a back panel connected to the rear edges of the first and second side panels. The back panel is preferably removable, such that the back panel may easily be replaced with a different back panel to adapt the enclosure to a different type of disk drive.

In yet another aspect of the present invention, an enclosure for receiving a group of drives is provided that includes an inner enclosure capable of receiving a group of drives. The enclosure includes an outer enclosure capable of receiving the inner enclosure. In response to the group of drives being received in the inner enclosure, it is inserted into the outer enclosure in a first insertion orientation and a second insertion orientation. The second insertion orientation is able to rotate 180° from the first insertion orientation with respect to a vertical axis of the inner enclosure.

The enclosure may include a conversion enclosure for converting a first group of drives of a first size adaptable to be received in a drive enclosure into a second group of drives of a second size. The outer enclosure can be received by the drive enclosure.

The inner enclosure can further include an inner enclosure chassis having first and second side panels, each of the side panels including a front edge and a rear edge, the first side panel being substantially parallel to and opposing the second side panel; a plurality of pairs of first and second chassis rails, the first rail of each of the pairs of chassis rails being connected to the first side panel, and the second rail of each of the pairs of chassis rails being connected to the second side panel; and a plurality of pairs of slots for receiving the second group of drives, wherein each slot is bounded on one side by a first plane passing through a first pair of chassis rails, and on the other side by a second plane passing through a second pair of chassis rails adjacent to the first pair of chassis rails.

The outer enclosure may also include an outer enclosure chassis having third and fourth side panels, each of the side panels including a front edge and a rear edge, the third side panel being substantially parallel to and opposing the fourth side panel; and a pair of engaging panels, each connected to the rear edge of the third side panel and the rear edge of the fourth side panel, wherein the panels respectively engage the drive enclosure in response to the conversion enclosure located in the drive enclosure.

A third aspect of the present invention provides an enclosure system for converting a first group of drives of a first size received in a drive enclosure into a second group of drives of a second size, with the enclosure system including the above inner enclosure and the above outer enclosure.

The foregoing and other features of the invention will be apparent from the following more particular description of the embodiments of the invention.

BRIEF DESCRIPTION OF THE DRAWINGS

The embodiments of this invention will now be described in detail with reference to the following figures, wherein.

DETAILED DESCRIPTION OF THE INVENTION

Figure 1:
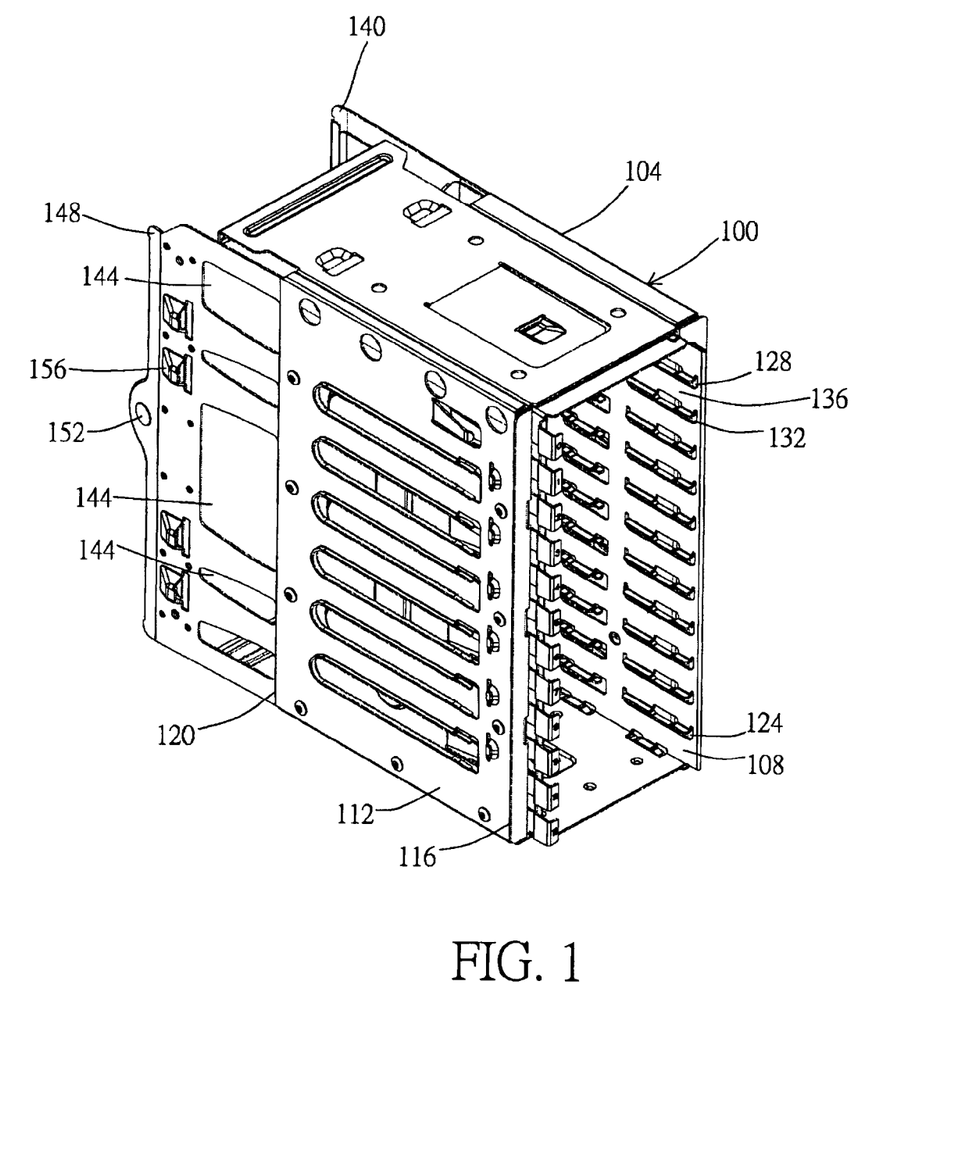
FIG. 1 shows an embodiment of the present invention, a disk drive conversion enclosure, in accordance with the present invention.

Referring to FIG. 1, a disk drive conversion enclosure 100 according to an embodiment of the present invention is illustrated. The disk drive conversion enclosure 100 preferably includes a chassis 104 having first and second side panels 108, 112. The first side panel 108 is substantially parallel to and opposing the second side panel 112. Each side panel has a front edge (e.g., the front edge 116 of the second side panel 112) and a rear edge (e.g., the rear edge 120 of second side panel 112). The disk drive conversion enclosure 100 also includes a plurality of pairs of first chassis rails 124, 128, 132. The first rail of each pair of first chassis rails 124, 128, 132 is connected to the first side panel 108, and the second rail of each pair of first chassis rails 124, 128, 132 is attached to the second side panel 112. The disk drive conversion enclosure 100 includes a plurality of pairs of slots 136. Each slot 136 is bounded on one side by a first plane passing through a pair of chassis rails 128, and on the other side by a second plane passing through a pair of chassis rails 132 adjacent to the pair of chassis rails 128. Each slot 136 receives a 2.5 inch disk drive (e.g., 2.5 inch hard disk drive) in a conventional setup. Consecutive slots 136 are designed to receive at most twelve 2.5 inch disk drives. The drive conversion enclosure 100 also includes a pair of engaging panels 140, 148. Panels 140, 148 are respectively connected to the rear edge (not shown) of the first side panel 108 and the rear edge 120 of the second side panel 112. The engaging panels 140, 148 respectively have at least one vented area 144 to increase the flexibility of the engaging panels 140, 148, and lessen the weight of the engaging panels 140, 148, as well as saving the cost of the material. The ratio of the vented area 144 and the area of each engaging panel 140, 148 is X. If the vented area is too small, the flexibility thereof will be insufficient; and if the vented area is too large, the structure of the engaging panels 140, 148 will be weak. The value of X preferably ranges between 0.37 and 1 to obtain the satisfactory effect. The engaging panels 140, 148 respectively have a handle 152 and an engaging device 156.

Figure 2:
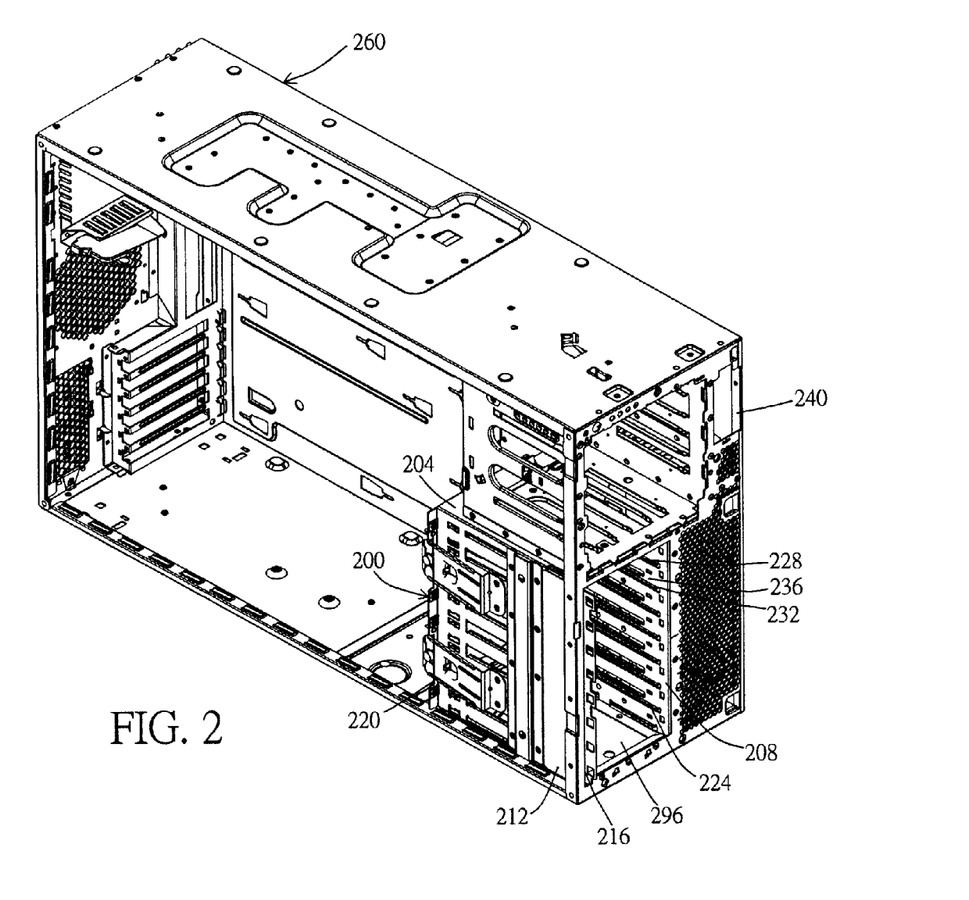
FIG. 2 shows an embodiment of a disk drive enclosure and a system enclosure, in accordance with the present invention.

FIG. 2 shows a preferred embodiment of drive enclosure 200. A system enclosure 260 and a front panel 240 of the system enclosure 260 are also shown. The system enclosure 260 can be used for a variety of systems. Drive enclosure 200 preferably includes a drive enclosure body 204. The drive enclosure body 204 has a third side panel 208 and a fourth side panel 212. Each side panel includes a front edge (e.g., the front edge 216 of the fourth side panel 212) and a rear edge (e.g., the rear edge 220 of the fourth side panel 212). The third side panel 208 and the fourth side panel 212 are substantially parallel and the second enclosure body 204 defines an inner space 296. The drive enclosure 200 includes a plurality of pairs of second chassis rails 224, 228, 232. The first rail of each pair of second chassis rails 224, 228, 232 is connected to the third side panel 208, and the second rail of each pair of second chassis rails 224 is connected to the fourth side panel 212. The disk drive enclosure 200 also includes a plurality of pairs of slots 236. Each slot 236 is bounded on one side by a first plane passing through a pair of chassis rails (e.g., a first plane passing through a pair of chassis rails 228), and by a second plane passing through a pair of chassis rails (e.g., through an adjacent pair of chassis rails 232). Additionally, the consecutive slots are designed to receive at most eight 3.5 inch disk drives, and each slot receives one 3.5 inch disk drive in a traditional way.

A backplane (not shown) is attached to the drive enclosure 200, preferably near the rear edge 220 of the fourth side panel 212, and a rear edge (not shown) of the first side panel 208. The backplane is replaceable, and thus different backplanes can be used in accordance with disk drives of different types and sizes.

Figure 3:
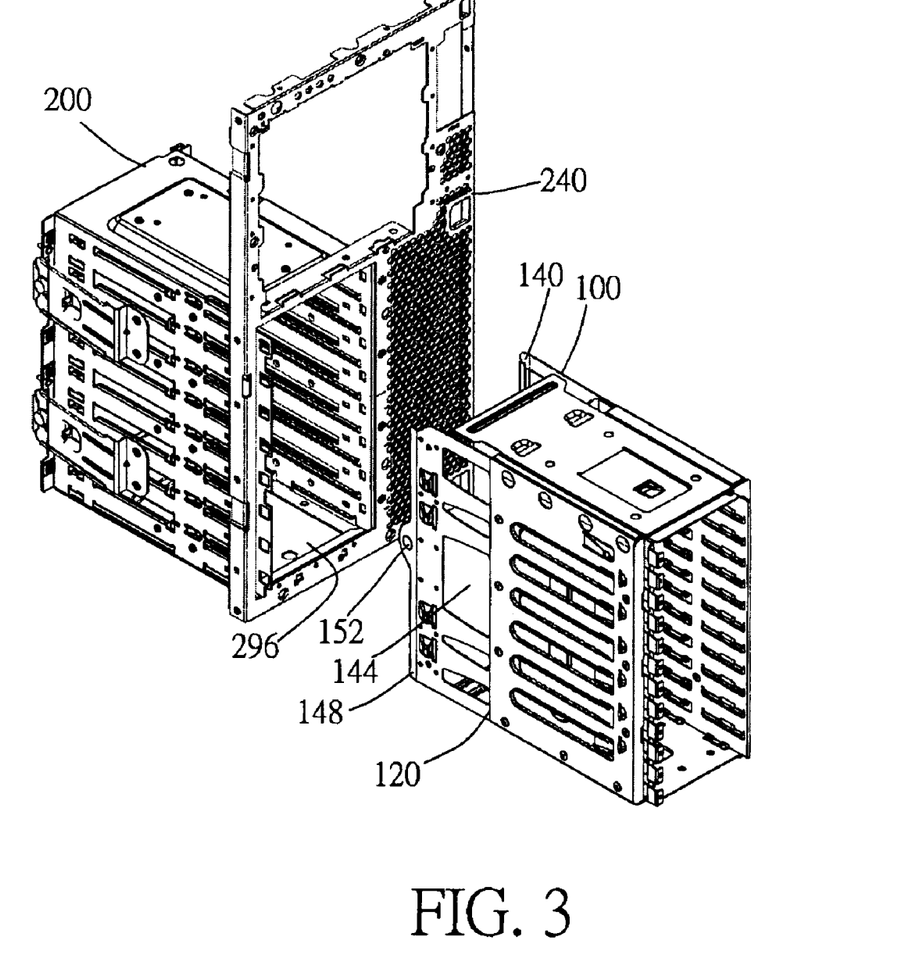
FIG. 3 shows an embodiment of the disk drive conversion enclosure, which is to be assembled into the disk drive enclosure, in accordance with the present invention.

FIG. 3 shows an embodiment of the disk drive conversion enclosure 100, which is to be inserted into the disk drive enclosure 200. The front panel 240 of the system enclosure is also shown. The disk drive conversion enclosure 100 can be correspondingly inserted into the inner space 296 of the disk drive enclosure 200. Because of the vented area 144, the engaging panels 140, 148 are more flexible, and thus, can be bent inwardly and easily inserted into the inner space 296. After inserting the disk drive conversion enclosure 100 and properly locating it in the inner space 296, the devices referenced by numeral 156 (FIG. 1) are engaged into disk drive enclosure 200.

Figure 4:
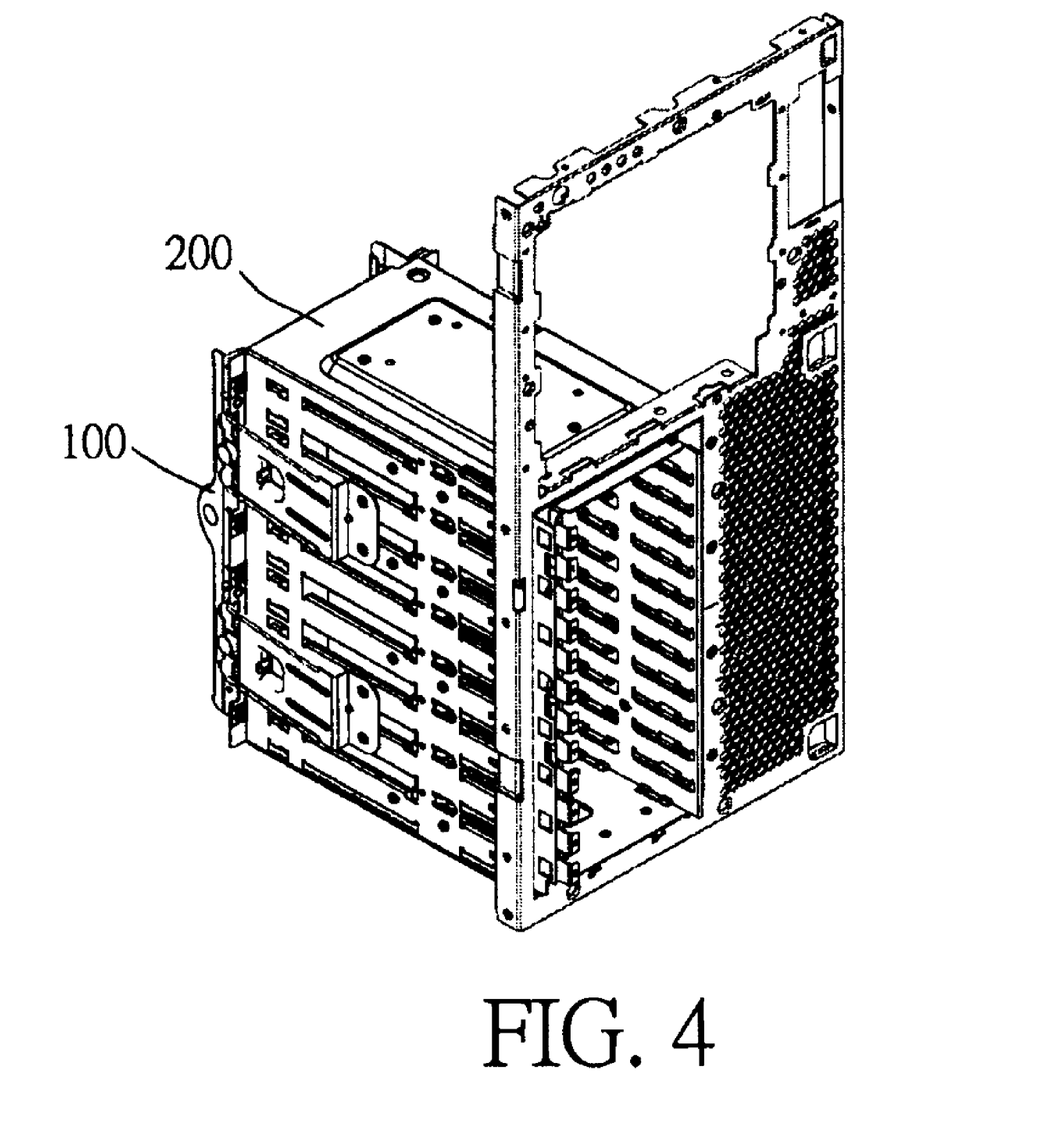
FIG. 4 shows an embodiment of the disk drive conversion enclosure, which is combined with the disk drive enclosure, in accordance with the present invention.

FIG. 4 shows the drive conversion enclosure 100 and the disk drive enclosure 200 after engaging the drive conversion enclosure 100 into disk drive enclosure 200.

According to FIG. 1 to FIG. 4, the disk drive enclosure 200 is originally designed to encase at most eight 3.5 inch hard disk drives. If a computer system manufacturer has only disk drive enclosures consisting of 3.5 inch disk drives, the products can be shipped soon after receipt of the order. On the other hand, even though no disk drive enclosures for 2.5 inch disk drives may be found in the warehouse, upon receipt of an order of systems having 2.5 inch disk drives, the manufacturer can still use the present invention to assemble the systems having 2.5 inch disk drives. Thus, the manufacturer simply uses the present conversion enclosures using either 3.5 inch disk drives or 2.5 inch disk drives that may now be shipped immediately. Thus, when the present drive conversion enclosure 100 is used, there is no need to previously prepare and store enclosures of different possible types and sizes, allowing orders of products containing disk drives of various types and sizes to be shipped without delay.

Figure 5:
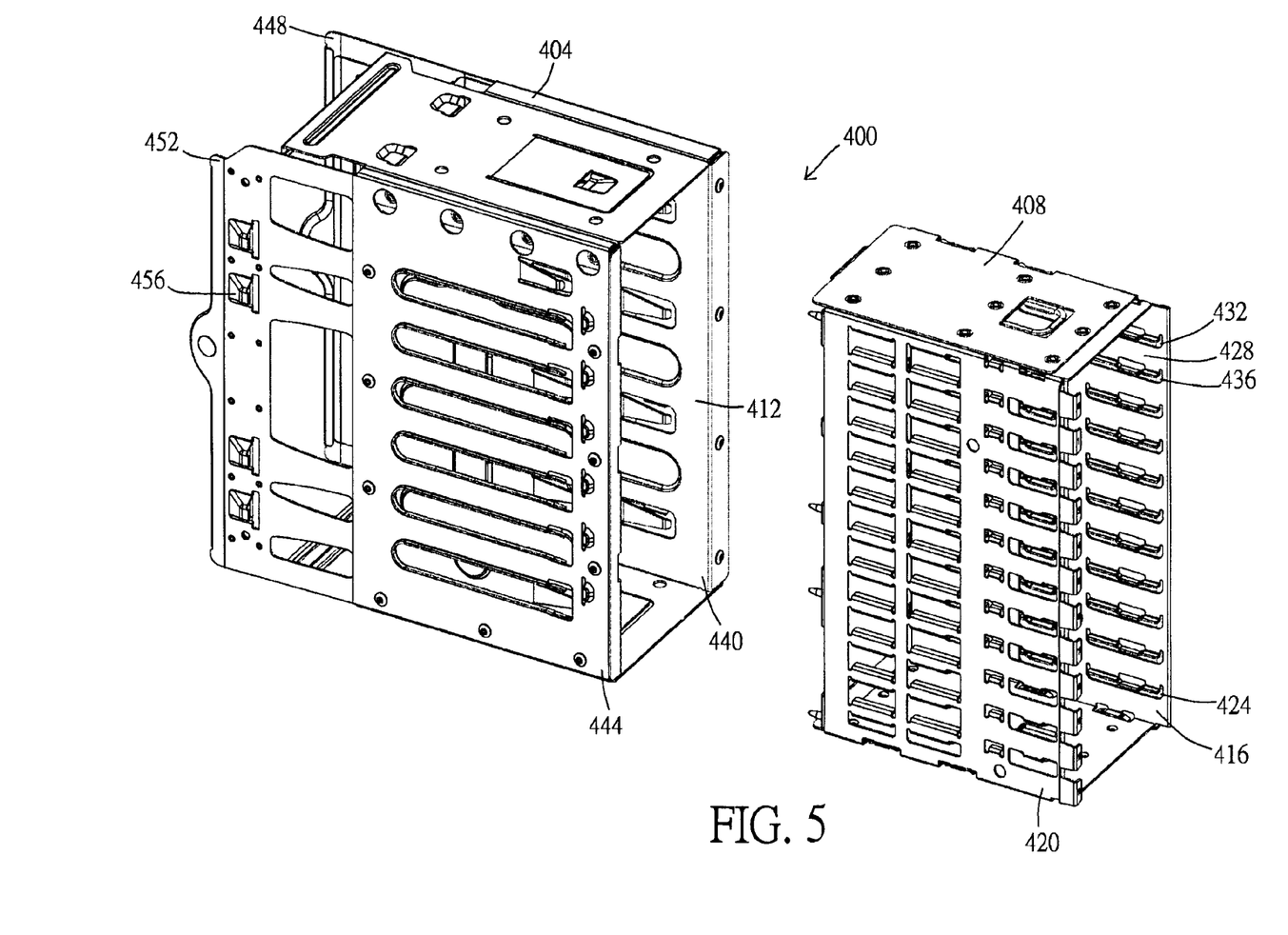
FIG. 5 shows another embodiment of the present invention, a drive conversion enclosure, in accordance with the present invention.

FIG. 5 shows in an embodiment of the present invention, a drive conversion enclosure 400. The drive conversion enclosure 400 converts a first group of drives of a first size (e.g., at most eight 3.5 inch disk drives) to be received by a drive enclosure 200 containing a second group of drives of a second size (e.g., at most twelve 2.5 inch disk drives). The drive conversion enclosure 400 preferably includes an outer enclosure chassis 404. The outer enclosure chassis 404 defines an inner space 412. The drive conversion enclosure 400 also includes an inner enclosure chassis 408, and receives a second group of disk drives (e.g., at most twelve 2.5 inch disk drives), which in turn are received by the inner space 412. The inner enclosure chassis 408 further includes, respectively, first and second side panels 416. Each side panel includes a front edge and a rear edge. The first side panel 416 is substantially parallel to and opposing the second side panel 420. The inner surface of the inner enclosure chassis 408 includes a plurality of pairs of first and second chassis rails 424, 432, 436. The first rail of each of the pairs of chassis rails 424, 432, 436 is connected to the first side panel 416, and the second rail of each of the pairs of chassis rails 424, 432, 436 is connected to the second side panel 420. The inner surface of the inner enclosure chassis 408 also includes a plurality of pairs of slots 428. Each slot 428 is bounded on one side by a first plane passing through a pair of chassis rails (e.g., a first plane passing through a pair of chassis rails 432) and by a second plane passing through a pair of chassis rails (e.g., a second plane passing through an adjacent pair of chassis rails 436). In the present embodiment, adjacent slots are designed to receive at most twelve 2.5 inch disk drives, each slot receiving a 2.5 inch disk drive.

The outer enclosure chassis 404 includes a third side panel 440 and a fourth side panel 444. Each side panel includes a front edge and a rear edge. The third side panel 440 is substantially parallel to and opposing the fourth side panel 444. The third side panel 440 and the fourth side panel 444 are arranged corresponding to the first side panel 416 and the second side panel 420. The outer enclosure chassis 404 also includes a pair of engaging panels 448, 452. The engaging panels 448, 452 are respectively connected to the rear edge of the third side panel 440 and the rear edge of the fourth side panel 444. The engaging panels 448, 452 are flexible and respectively have an engaging device 456. Thereafter, the outer enclosure chassis 404 and the inner enclosure chassis 408 are combined to form the disk drive conversion enclosure 400. In response to the disk drive conversion enclosure 400 being inserted and correspondingly located in the disk drive enclosure, engaging panels 448, 452 of the outer enclosure chassis are advantageously bent inwardly and the entire assembly is inserted through an opening of the drive enclosure. In response to the conversion enclosure 400 being located in the drive enclosure 200, the panels are respectively engaged in drive enclosure 200, as described in the previous embodiment. Similarly, the engaging panels 448, 452 respectively have a vented area to increase the flexibility, to reduce the weight, and limit the cost. The ratio of the vented area and the whole area of each engaging panels is X, wherein X ranges, preferably, between about 0.37 and 1.

After inserting the second group of disk drives (e.g., at most twelve 2.5 inch disk drives) into the inner enclosure 408, the inner enclosure 408 including the drives can be inserted in the inner space 412 of the outer enclosure 404 in a first insertion orientation. The inner enclosure 408 is, likewise, inserted into the inner space 412 of the outer enclosure 404 in a second insertion orientation. The second insertion orientation is a second orientation rotated 180° from the first insertion orientation with respect to a vertical axis of the inner enclosure 408. According to an embodiment of the present invention, after pulling away the inner enclosure 408 from the outer enclosure 404, if the inner enclosure is rotated 180° and inserted into the inner space 412 of the outer enclosure 404, the inner enclosure 408 and the outer enclosure 404 can also be combined.

As mentioned previously, the inner enclosure 408 can be inserted into the inner space 412 of the outer enclosure 404 maintaining the first insertion orientation or the second orientation. By choosing one of the first insertion orientation or the second orientation to insert the inner enclosure 408 into outer enclosure 404, the color sequence of the LEDs of the disk drives can be determined regardless of the tower type server selected to serve as a rack type server. According to the present disk drive conversion enclosure 400, when the system enclosure 200 is horizontally located, the location of the LEDs from left to right is a green LED followed by an amber LED, a green LED, an amber LED, and the like. When the system enclosure is vertically located, the location of the LEDs from top to bottom is a green LED, an amber LED, a green LED, an amber LED, and the like.

After disk drives are inserted into the inner enclosure 408 and the inner enclosure 408 with the drives are inserted into the outer enclosure 404, if the user finds that the color sequence of the LEDs of the disk drives does not conform to the rules for individuals having poor color vision, the user then can pull out the inner enclosure 408 with the drives and rotate them 180° with respect to the original insertion orientation. After inserting the inner enclosure 408 with the drives, the color sequence of the LEDs of the disk drives will conform to the rules.

After the products are delivered to the customer, the customer can also choose the insertion orientation of the inner enclosure 408 into the outer enclosure 404 when setting up the environment to allow the color sequence of the LEDs of the disk drives conform to the rules.

According to the present invention, either when the enclosure is placed vertically or horizontally, the position of the green and amber LEDs can conform to the rules. To sum up, the present invention provides a drive conversion technology which is user friendly to individuals with poor vision.

The application of the present invention is not limited to the disk drive enclosures, other enclosures can use the present technology under proper circumstances. Neither it is limited to converting a group of at most eight 3.5 inch disk drives into a group of at most twelve 2.5 inch disk drives. The present invention can also convert a group of at most twelve 2.5 inch disk drives into a group of at most eight 3.5 inch disk drives.

While this invention has been described in conjunction with the specific embodiments outlined above, it is evident that many alternatives, modifications and variations will be apparent to those skilled in the art. E.g., the drives are not limited to hard disk drives, but can be other drives, such as solid state drives. Accordingly, the embodiments of the invention as set forth above are intended to be illustrative, not limiting. Various changes may be made without departing from the spirit and scope of the invention as defined in the following claims.

What is claimed is:

1. A conversion enclosure for converting a first group of drives of a first size adapted to be received in a drive enclosure having a second group of drives of a second size, comprising: a chassis having first and second side panels, each of said side panels including a front edge and a rear edge, said first side panel being substantially parallel to and opposing said second side panel and said chassis being correspondingly received in said drive enclosure; a plurality of pairs of first and second chassis rails, the first rail of each of said pairs of chassis rails being connected to said first side panel, and the second rail of each of said pairs of chassis rails being connected to said second side panel; a plurality of pairs of slots for respectively receiving said second group of drives, wherein each slot is bounded on one side by a first plane passing through a first pair of chassis rails, and on the other side by a second plane passing through a second pair of chassis rails adjacent to the first pair of chassis rails; and a pair of engaging panels, each connected to said rear edge of said first side panel and said rear edge of said second side panel, wherein said engaging panels respectively engage said drive enclosure in response to said conversion enclosure located in said drive enclosure, and wherein each of said engaging panels has a vented area.

2. The conversion enclosure of claim 1, wherein the ratio of the vented area and the area of each of said engaging panels is X, where X ranges between 0.37 and 1.

3. The conversion enclosure of claim 1, wherein said engaging panels are bent inwardly and are inserted into an opening of said drive enclosure in response to said conversion enclosure being inserted into said drive enclosure.

4. The conversion enclosure of claim 1, wherein said first group of drives of a first size comprises a group of 3.5 inch hard disk drives, the number of said first group ranging from 1 to 8, said second group of drives of a second size comprising a group of 2.5 inch hard disk drives, the number of said second group ranging from 1 to 12.

5. The conversion enclosure of claim 1, wherein said first group of drives of a first size comprises a group of 2.5 inch hard disk drives, the number of said first group ranging from 1 to 12, and said second group of drives of a second size comprising a group of 3.5 inch hard disk drives, the number of said second group ranging from 1 to 8.

6. The conversion enclosure of claim 1, wherein said drive enclosure comprises a hard drive enclosure of a system enclosure.

7. The conversion enclosure of claim 1, wherein said drive is selected from a group consisting of a hard disk drive and a solid state drive, and wherein said drive enclosure is selected from a group consisting of a hard disk drive enclosure and a solid state drive enclosure.

8. An enclosure for receiving a group of drives, comprising: an inner enclosure receiving a plurality of drives and an outer enclosure receiving said inner enclosure; in response to said plurality of drives, said inner enclosure is inserted into said outer enclosure in a first insertion and a second insertion orientation, said second insertion orientation being an orientation rotated 180° from said first insertion orientation with respect to a vertical axis of said inner enclosure.

9. The enclosure of claim 8, wherein said enclosure converts a first plurality of drives of a first size and is adapted to be received in a drive enclosure having a second plurality of drives of a second size.

10. The enclosure of claim 8, wherein said outer enclosure is correspondingly received in said drive enclosure.

11. The enclosure of claim 8, wherein said inner enclosure comprises: an inner enclosure chassis having first and second side panels, each of said side panels including a front edge and a rear edge, said first side panel being substantially parallel to and opposing said second side panel; a plurality of pairs of first and second chassis rails, the first rail of each of said pairs of chassis rails being connected to said first side panel, and the second rail of each of said pairs of chassis rails being connected to said second side panel; and plurality of pairs of slots for receiving said second group of drives, wherein each slot is bounded on one side by a first plane passing through a first pair of chassis rails, and on the other side by a second plane passing through a second pair of chassis rails adjacent to the first pair of chassis rails.

12. The enclosure of claim 8, wherein said outer enclosure comprises: an outer enclosure chassis having third and fourth side panels, each of said side panels including a front edge and a rear edge, said third side panel being substantially parallel to and opposing said fourth side panel; and pair of engaging panels, each connected to said rear edge of said third side panel and said rear edge of said fourth side panel, wherein said engaging panels respectively engage said drive enclosure in response to said conversion enclosure located in said drive enclosure.

13. The enclosure of claim 12, wherein said engaging panels each have a vented area.

14. The enclosure of claim 13, wherein the ratio of the vented area and the whole area of each of said engaging panels is X, wherein X is preferably between about 0.37 and 1.

15. The enclosure of claim 12, wherein said engaging panels are bent inwardly and are inserted into an opening of said drive enclosure in response to said conversion enclosure being inserted into said drive enclosure.

16. The enclosure of claim 8, wherein said drive enclosure comprises a hard drive enclosure of a system enclosure, wherein said drive is selected from a group consisting of a hard disk drive and a solid state drive, and wherein said drive enclosure is selected from a group consisting of a hard disk drive enclosure and a solid state drive enclosure.

17. An enclosure system for converting a first group of drives of a first size received in a drive enclosure into a second group of drives of a second size, comprising: an inner enclosure capable of receiving said second group of drives, comprising: an inner enclosure chassis having first and second side panels, each of said side panels including a front edge and a rear edge, said first side panel being substantially parallel to and opposing said second side panel a plurality of first pairs of chassis rails, the first rail of each of said first pairs of chassis rails being connected to said first side panel, and the second rail of each of said pairs of chassis rails being connected to said second side panel; and a plurality of first pairs of slots for respectively receiving said second group of drives, wherein each slot is bounded on one side by a first plane passing through a first pair of chassis rails, and on the other side by a second plane passing through a second pair of chassis rails adjacent to the first pair of chassis rails; and an outer enclosure capable of receiving said inner enclosure and being correspondingly received in said hard disk drive enclosure, comprising an outer enclosure chassis having third and fourth side panels, each of said side panels including a front edge and a rear edge, said third side panel being substantially parallel to and opposing said fourth side panel; and a pair of engaging panels, each respectively connected to said rear edge of said third side panel and said rear edge of said fourth side panel, said engaging panels respectively each having flexibility and comprising an engaging means, wherein said engaging panels respectively engage said drive enclosure in response to said inner enclosure received in outer enclosure and said outer enclosure received in said drive enclosure.

18. The enclosure system of claim 17, wherein said engaging panels each have a vented area.

19. The enclosure system of claim 18, wherein the ratio of the vented area and the whole area of each of said engaging panels is X, wherein X is in the range between about 0.37 and 1.

20. The enclosure system of claim 18, wherein said engaging panels are bent inwardly and are inserted into an opening of said drive enclosure in response to said conversion enclosure being inserted into said drive enclosure.

21. The enclosure system of claim 18, wherein said drive enclosure comprises a hard drive enclosure of a system enclosure.

22. The enclosure system of claim 18, wherein said drive is selected from a group consisting of a hard disk drive and a solid state drive, and wherein said drive enclosure is selected from a group consisting a hard disk drive enclosure and a solid state drive enclosure.

23. The enclosure system of claim 18, further comprising a back panel connected to said rear edges of said first and second side panels.

24. The enclosure system of claim 23, said back panel is removable, such that said back panel can be replaced with a different back panel to adapt said enclosure to receive a different type of disk drive.

* * * * *